United States Patent
Muirhead

(10) Patent No.: US 10,339,619 B2
(45) Date of Patent: Jul. 2, 2019

(54) METHOD AND APPARATUS FOR PRESENTING SUPPLY CHAIN INFORMATION TO A CONSUMER

(71) Applicant: Scott Arthur William Muirhead, Langley (CA)

(72) Inventor: Scott Arthur William Muirhead, Langley (CA)

(*) Notice: Subject to any disclaimer, the term of this patent is extended or adjusted under 35 U.S.C. 154(b) by 0 days.

(21) Appl. No.: 14/835,703

(22) Filed: Aug. 25, 2015

(65) Prior Publication Data

US 2017/0323412 A1    Nov. 9, 2017

(51) Int. Cl.
| | | |
|---|---|---|
| *G06K 7/10* | (2006.01) | |
| *G06F 16/25* | (2019.01) | |
| *G06K 19/07* | (2006.01) | |
| *G06Q 30/00* | (2012.01) | |
| *G06Q 50/28* | (2012.01) | |
| *G06Q 50/00* | (2012.01) | |

(52) U.S. Cl.
CPC .......... *G06Q 50/28* (2013.01); *G06F 16/258* (2019.01); *G06K 7/10297* (2013.01); *G06K 19/0717* (2013.01); *G06K 19/0723* (2013.01); *G06Q 30/0185* (2013.01); *G06Q 50/01* (2013.01)

(58) Field of Classification Search
CPC .... G06Q 50/28; G06Q 50/01; G06Q 30/0185; G06K 7/10297; G06K 19/0717; G06K 19/0723; G06F 16/258
See application file for complete search history.

(56) References Cited

U.S. PATENT DOCUMENTS

| 6,177,879 B1 * | 1/2001 | Kokubu ............. B60L 11/1801 |
| | | 340/432 |
| 7,158,028 B1 * | 1/2007 | Ghahramani .......... G06Q 10/08 |
| | | 340/521 |
| 7,468,927 B1 * | 12/2008 | Battista ................. G01S 5/0027 |
| | | 365/191 |
| 7,932,827 B2 * | 4/2011 | Chand .................. G01C 21/206 |
| | | 235/375 |

(Continued)

OTHER PUBLICATIONS

Katina Michael, "The Pros and Cons of RFID in Supply Chain Management", IEEE Computer Society, 2005, all pages. "katina" ( Year: 2005).*

*Primary Examiner* — Kevin H Flynn
*Assistant Examiner* — Omar Zeroual
(74) *Attorney, Agent, or Firm* — Price & Adams, P.C.

(57) ABSTRACT

A smart tracking device, such as a cellular M2M device, is attached to a plastic pallet for monitoring, recording and reporting the location, condition and manifest record of the pallet as it moves through a supply chain for shipment of products from a manufacturer to a consumer. The cellular M2M device has a subscriber identification module (SIM) to uniquely identify the pallet with which it is associated in a cellular network. The M2M device receives and transmits data about the products on the pallet, as the pallet moves through the supply chain. Actionable data allows supply chain managers to mitigate risks and losses in the supply chain. The supply chain data is also used to provide an electronic supply chain pedigree for a product shipped on the pallet. The product supply chain pedigree is made available to a consumer in a structured format, in order to influence the consumer's purchasing decisions.

14 Claims, 7 Drawing Sheets

(56) References Cited

U.S. PATENT DOCUMENTS

| | | | |
|---|---|---|---|
| 7,954,712 B2* | 6/2011 | Babcock | G06Q 10/08 235/375 |
| 7,969,306 B2* | 6/2011 | Ebert | G06K 17/00 340/539.11 |
| 8,766,797 B2 | 7/2014 | Hamm et al. | |
| 8,973,835 B2 | 3/2015 | Salzman et al. | |
| 8,989,053 B1* | 3/2015 | Skaaksrud | H04W 12/06 370/255 |
| 9,069,770 B2 | 6/2015 | Werner et al. | |
| 9,087,333 B2 | 7/2015 | Kim et al. | |
| 9,121,840 B2 | 9/2015 | Minvielle | |
| 9,230,372 B2 | 1/2016 | Kadaba | |
| 9,436,853 B1* | 9/2016 | Meyers | G06K 7/0008 |
| 9,788,151 B2* | 10/2017 | Duan | G01S 5/02 |
| 10,078,865 B2* | 9/2018 | Joshi | G06Q 30/0269 |
| 2002/0057192 A1* | 5/2002 | Eagleson | G06K 17/0022 340/305 |
| 2002/0184062 A1* | 12/2002 | Diaz | G06Q 10/06 701/29.3 |
| 2003/0089771 A1* | 5/2003 | Cybulski | B65D 19/00 235/385 |
| 2003/0120509 A1* | 6/2003 | Bruch | G06Q 10/02 705/307 |
| 2003/0146836 A1* | 8/2003 | Wood | G06K 19/0717 340/540 |
| 2005/0076816 A1* | 4/2005 | Nakano | B65D 19/0012 108/51.11 |
| 2005/0171738 A1* | 8/2005 | Kadaba | G06K 19/0717 702/187 |
| 2006/0080074 A1* | 4/2006 | Williams | G06F 17/509 703/13 |
| 2006/0080819 A1* | 4/2006 | McAllister | G06K 17/00 29/403.3 |
| 2006/0212165 A1* | 9/2006 | Watanabe | B65D 19/38 700/217 |
| 2006/0255950 A1* | 11/2006 | Roeder | B62B 3/06 340/572.7 |
| 2006/0261946 A1* | 11/2006 | Himberger | G06K 19/0717 340/572.1 |
| 2007/0021100 A1* | 1/2007 | Haave | B60R 25/102 455/404.2 |
| 2007/0080804 A1* | 4/2007 | Hirahara | G06K 7/0008 340/572.1 |
| 2007/0156491 A1* | 7/2007 | Schuler | G06Q 10/06315 705/7.25 |
| 2007/0268138 A1* | 11/2007 | Chung | G01S 5/0018 340/572.1 |
| 2007/0290836 A1* | 12/2007 | Ainsworth | G06Q 10/08 340/539.13 |
| 2008/0001758 A1* | 1/2008 | Bhogal | G06K 7/0008 340/572.7 |
| 2008/0103944 A1* | 5/2008 | Hagemann | B65D 19/004 705/28 |
| 2008/0111689 A1* | 5/2008 | Schuler | G06Q 10/08 340/572.1 |
| 2008/0210140 A1* | 9/2008 | Valentinsson | B65D 19/0014 108/57.25 |
| 2008/0224866 A1* | 9/2008 | Rehman | G08B 13/2417 340/572.1 |
| 2008/0294488 A1* | 11/2008 | Gupta | G06Q 10/06316 705/7.26 |
| 2009/0201130 A1* | 8/2009 | Greenlee | G06K 7/0008 340/10.1 |
| 2010/0012000 A1* | 1/2010 | Gordon | B65D 19/20 108/56.3 |
| 2010/0026466 A1* | 2/2010 | Colby | G06K 19/025 340/10.4 |
| 2010/0039284 A1* | 2/2010 | Hall | G06Q 10/06 340/8.1 |
| 2010/0127875 A1* | 5/2010 | Wong | G06K 7/0008 340/572.7 |
| 2010/0156606 A1* | 6/2010 | Gold | H04Q 9/00 340/10.4 |
| 2010/0176922 A1* | 7/2010 | Schwab | G06K 7/10356 340/10.1 |
| 2010/0182150 A1* | 7/2010 | Edelstain | B65D 19/38 340/572.8 |
| 2010/0185482 A1* | 7/2010 | Sicard | G06Q 10/063114 705/7.15 |
| 2011/0012713 A1* | 1/2011 | Wilkinson | G06K 7/10178 340/10.3 |
| 2011/0074587 A1* | 3/2011 | Hamm | G06Q 10/08 340/584 |
| 2011/0227725 A1* | 9/2011 | Muirhead | B65D 19/0016 340/539.13 |
| 2012/0075071 A1* | 3/2012 | Liu | B65D 19/001 340/10.1 |
| 2012/0166241 A1* | 6/2012 | Livingston | G06Q 10/0631 705/7.12 |
| 2013/0002443 A1* | 1/2013 | Breed | G01J 5/0846 340/686.1 |
| 2013/0030725 A1* | 1/2013 | Friedlander | G01H 1/12 702/56 |
| 2013/0059534 A1* | 3/2013 | Sobalvarro | G06Q 30/02 455/41.1 |
| 2013/0063251 A1 | 3/2013 | Allen | |
| 2013/0065603 A1* | 3/2013 | Hovav | H04W 4/029 455/456.1 |
| 2013/0087610 A1* | 4/2013 | Shin | G06Q 10/08 235/375 |
| 2013/0324151 A1* | 12/2013 | Lee | H04W 24/00 455/456.1 |
| 2013/0324152 A1* | 12/2013 | Lee | H04W 64/006 455/456.1 |
| 2014/0049392 A1 | 2/2014 | Wagner | |
| 2014/0055244 A1 | 2/2014 | Burchell et al. | |
| 2014/0067708 A1 | 3/2014 | Lau et al. | |
| 2014/0070943 A1* | 3/2014 | Breed | E05F 15/43 340/539.11 |
| 2014/0074668 A1* | 3/2014 | Gomez | G06Q 10/08 705/28 |
| 2014/0075572 A1* | 3/2014 | Mehring | G06F 21/6218 726/28 |
| 2014/0102338 A1* | 4/2014 | Stevens | B65D 19/0095 108/50.11 |
| 2014/0121807 A1* | 5/2014 | Jung | G06Q 10/06313 700/115 |
| 2014/0129383 A1 | 5/2014 | Farmer et al. | |
| 2014/0129475 A1 | 5/2014 | Salvat | |
| 2014/0136218 A1 | 5/2014 | Bolene et al. | |
| 2014/0136430 A1 | 5/2014 | Pope | |
| 2014/0158754 A1 | 6/2014 | Larmo et al. | |
| 2014/0164098 A1 | 6/2014 | Chanda et al. | |
| 2014/0172653 A1 | 6/2014 | Sribhibhadh et al. | |
| 2014/0180953 A1 | 6/2014 | Westcott et al. | |
| 2014/0253297 A1* | 9/2014 | Kawaguchi | G06Q 10/083 340/10.51 |
| 2014/0306806 A1 | 10/2014 | Martinez de Velasco Cortina et al. | |
| 2014/0350710 A1 | 11/2014 | Gopalakrishnan et al. | |
| 2015/0012457 A1 | 1/2015 | Gonzalez et al. | |
| 2015/0029001 A1 | 1/2015 | Pleshek et al. | |
| 2015/0095193 A1 | 4/2015 | Shim et al. | |
| 2015/0100428 A1 | 4/2015 | Parkinson, Jr. | |
| 2015/0235169 A1 | 8/2015 | Atkinson | |
| 2015/0235235 A1 | 8/2015 | Koren | |
| 2015/0349917 A1* | 12/2015 | Skaaksrud | G06Q 10/0833 370/328 |
| 2016/0072891 A1* | 3/2016 | Joshi | G06Q 30/0269 370/254 |
| 2016/0189174 A1* | 6/2016 | Heath | G06Q 30/0201 705/7.29 |
| 2016/0212579 A1* | 7/2016 | Duan | G01S 5/02 |
| 2016/0224929 A1* | 8/2016 | Blanchard | G06Q 10/0833 |
| 2016/0371521 A1* | 12/2016 | Moon | G06K 7/10445 |
| 2017/0006424 A1* | 1/2017 | Liin | H04W 4/023 |

(56) References Cited

U.S. PATENT DOCUMENTS

2017/0032382 A1\* 2/2017 Shulman ................ G06Q 30/06
2017/0091156 A9\* 3/2017 Cook ..................... G06Q 30/02
2017/0313269 A1\* 11/2017 Breed ................. B60C 23/0479

\* cited by examiner

METHOD AND APPARATUS FOR PRESENTING SUPPLY CHAIN INFORMATION TO A CONSUMER

CROSS REFERENCE TO RELATED APPLICATIONS

The present application claims priority from U.S. Provisional Application No. 62/071,190 fried Aug. 25, 2014.

BACKGROUND OF THE INVENTION

1. Field of the Invention

The present invention relates to mobile and PC applications that consumers use to obtain a supply chain pedigree for a product of interest shipped on a smart pallet.

2. Description of the Prior Art

The vast majority of all fast moving consumer goods (FMCG) are delivered to the consumer on pallets. According to industry statistics up to 97 percent of all FMCG products are shipped on wood pallets, with the balance being shipped on pallets made of plastic, metal, and other non-wood materials. Pallets used by the FMCG industry typically measure 48×40 inches, and are known as GMA style pallets.

During their journey on a pallet many of these products are subject to risks and damage due to spoilage, theft, waste, contamination, diversion, counterfeiting and other forms of loss. The security and sustainability of supply chains used by the FMCG industry are routinely compromised resulting in billions of dollars of outright losses, rejected loads and recalls When a consumer wants to learn more about a product of interest, there is no way to determine if the product is safe or authentic. Consumers instead rely upon the reputations of brand names and retailers who sell these products. Despite the best intentions of manufacturers and retailers, risks, damages and losses still occur, so there remains a need to know a product's safety, authenticity, and efficacy through other means, before buying a product of interest.

Products shipped on today's wood pallets are invisible for the duration of their trips within supply chains because they do not include wireless devices that can monitor, record, and report their position, condition and manifest records. Therefore, conditions indicative of the supply chain journey for most FMCG products are unknown to the manufacturer, retailer and consumer. This is one reason why the Food Safety Modernization Act (FSMA) was enacted in 2010. The FSMA aims to prevent risks in supply chains.

Wood pallets themselves are directly attributable to many of the risks and losses that occur while products are transported, stored or displayed on them. For example, an average dry GMA style wood pallet weighs 50 pounds when it is new. Over time the wood absorbs chemicals, pathogens, insects, dyes, debris and liquids and increases in weight to an average of 78 pounds. The absorbed materials in a wet wood pallet can damage products and their packaging. Wood pallets also deteriorate with wear and tear so that nails, splinters and missing boards result in further product losses, equipment damage and worker injury. Today's wood pallets are not serialized and so a particular wood pallet that causes damage or creates risks cannot be isolated and removed from the supply chain to prevent re-occurring problems.

What is needed is a long lasting and recyclable pallet that can be pooled in large numbers to replace today's wood pallet fleets. Plastic pallets are lighter weight, non-hydroscopic, 100% recyclable, and their materials can be resold for their original value at the end of their life as a pallet. Plastic pallets are more sustainable. Ore exemplary plastic pallet is identified in co-pending application Ser. No. 14/556,187, which is incorporated in its entirety by reference.

What is also needed is a plastic pallet with a wireless device that can monitor, record and report the position, condition and manifest records of a pallet nationally 24/7/365. Pallet data from the wireless device can be used in three important ways. First the plastic pallet pool operator can use the wireless device to track each pallet to better manage its assets for rental income. Because wood pallets are not serialized many are misplaced and wood pool operators must expend CAPEX to replace lost pallets. Plastic pallets with wireless devices can be tracked and so they will not be lost, eliminating wasteful CAPEX. Second, the shipper can use the wireless device to obtain actionable data about the condition and circumstances affecting their products during their journey to the consumer. With actionable real time data supply chain managers can mitigate the severity and prevent the re-occurrence of risks resulting in losses in their supply chains. Third, the pool operator and shipper can aggregate the pallet data and the product data to provide a supply chain pedigree that a consumer can investigate in order to make an informed purchasing decision about a product of interest.

All of the products of interest shipped in a prior art wood pallet based supply chain are invisible and vulnerable during their time on a pallet. What is needed is method and apparatus for supplying a customer with a pallet trip pedigree. Giving the consumer choices based upon supply chain information will trans form commerce and lead to more sustainable outcomes than today's inefficient practices embodied by the contemporaneous wood pallet pooling business model.

SUMMARY OF THE INVENTION

In accordance with the present invention there is provided a method for supplying a consumer with information about the status of products shipped on a pallet in a supply chain for distributing the products to the consumer that includes the steps of positioning a smart tracking device on the pallet to tract and manage the products carried by the pallet during shipment to the consumer. A readable identifier is affixed to a product on the pallet. The smart tracking device is associated with the machine readable identifier in a pallet data base. The smart tracking device is programmed to selectively capture data predefined by the machine readable identifier regarding the status of the product during shipment. Selected data is captured on the status of the pallet and the products carried by the pallet as the pallet moves in the supply chain. The selected data captured by the pallet during movement of the pallet through the supply chain is stored to create a record of the pallet movement. The supply chain data is aggregated in the pallet data base. The selected data captured on the status of the pallet is discriminated from the selected data captured on the products in the pallet data base. The selected data, captured on the status of the products during shipment is copied in a product data base separate from the pallet data base. The smart tracking device is disassociated from the machine readable identifier by removing the products from the pallet. The product data stored on the product data base is presented in a structured format. The products are delivered to the consumer. A communications link is established to receive the product data in a structured format generated during movement of the pallet in the supply chain.

Further in accordance with the present invention there is provided a system for documenting information on a product selected by a consumer for delivery through a supply chain accessible on a mobile communications device that includes a distribution pallet for transporting, storing and reporting the status of the products moving through a supply chain on the pallet to the consumer. A machine readable identifier is associated with the product for movement in the supply chain. A smart device is mounted on the distribution pallet. The smart device includes a Machine to Machine (M2M) cellular transceiver having a microprocessor, sensors, antennae, and a power supply. The M2M or SIM card cellular transceiver provides communications between the pallet and a pallet management entity to document a pallet trip record by manifest data indicating use of the pallet. The smart device includes at least one of an EPC RFID reader/writer, a ISO 18000 device and an IEEE 802N device. The devices are connected to the cellular transceiver and the microprocessor to provide local communications between the distribution pallet and a wireless network included in the supply chain to generate data on the location and status of the product transported, by the pallet through the supply chain.

Additionally the present invention is directed to a process for presenting information from a manufacturer to a consumer reporting on the status of the movement of the shipment of a product on a pallet from the manufacturer to the consumer that includes the steps of supplying a pallet with a tracking device operable to record data on the status of the pallet during movement between the manufacturer and the consumer. The data on the status of the pallet is transmitted through a portal accessible through at least one of a cellular transceiver, a ISO 1800 device, and an IEEE 802N device. The product bearing a machine readable identifier is placed on the pallet to track the product moving through a supply chain for delivery to the consumer. A selected identifier is assigned to the pallet tracking device associated with the machine readable identifier in an external data base to link a record of the status of the movement of the product in the supply chain with a record of movement of the pallet in the supply chain to provide a record of the supply chain history of the product. Selected information about the product is extracted in a structured format from the record of movement of the pallet in the supply chain. The extracted selected information for a product is accessed by reading the machine readable identifier with a mobile communication device for receipt of the selected supply chain information on a structured format.

A principal object of the present invention is to provide a plastic pallet with a wireless device for monitoring, recording, and reporting the position, condition, and manifest records of a pallet in real, time as it moves through the supply chain.

Another object of the present invention is to provide a pallet logistics system for enabling a shipper to obtain actionable data about the status of products as they are moved through a supply chain on plastic pallets to a consumer.

A further object, of the present invention is to provide a process for a pallet pool operator and a pallet shipper to aggregate data on the status of a pallet through a supply chain for creating a supply chain pedigree for use by the consumer in making informed decisions about a product of interest.

These and other objects of the present invention will be more completely disclosed and described in the following specification, accompanying drawings, and appended claims.

DETAILED DESCRIPTION OF THE INVENTION

Figure 1:
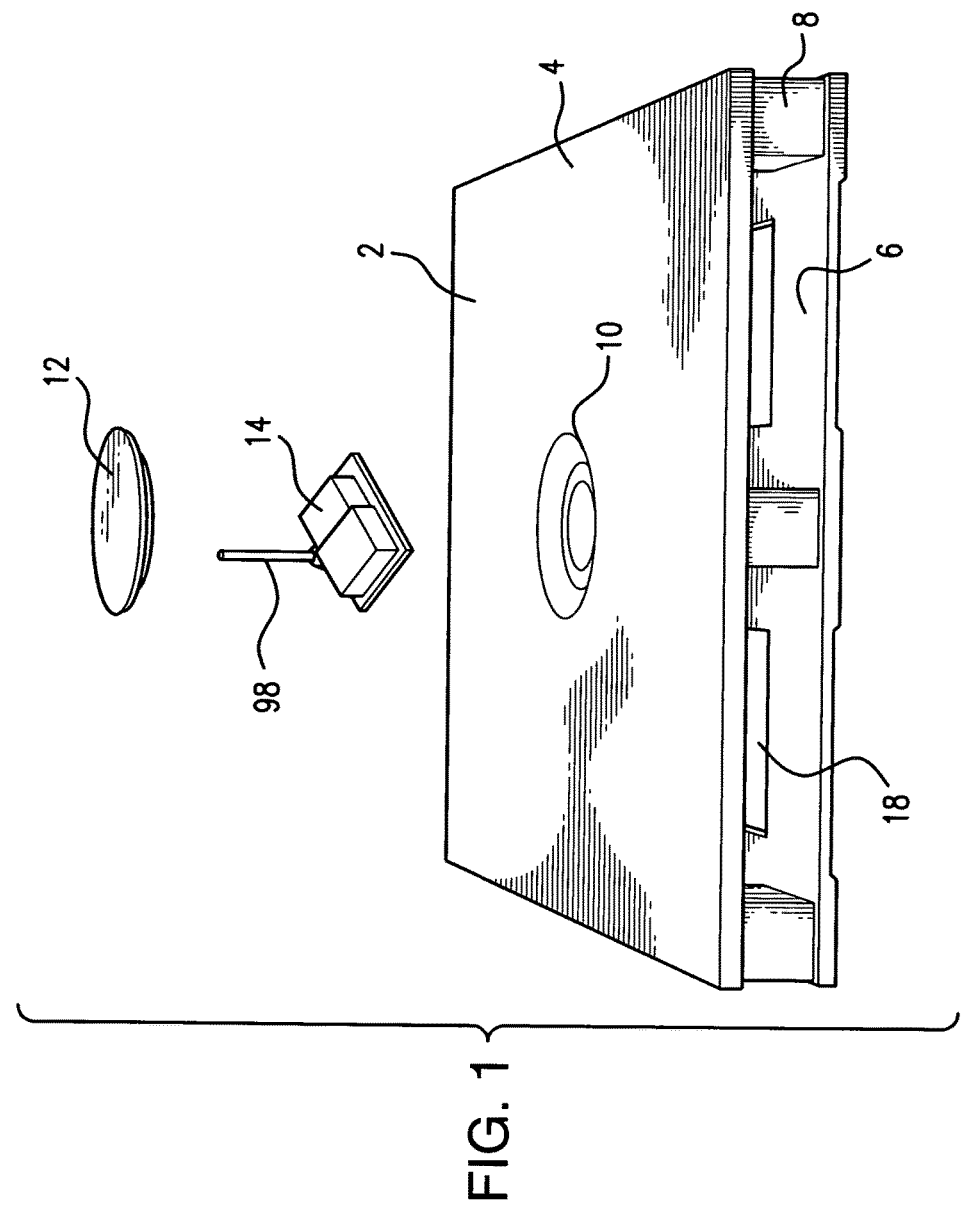
FIG. 1 is an exploded perspective view of a 48×40 inch plastic pallet with nine blocks and a compartment for housing a pallet tracking device.
Figure 2:
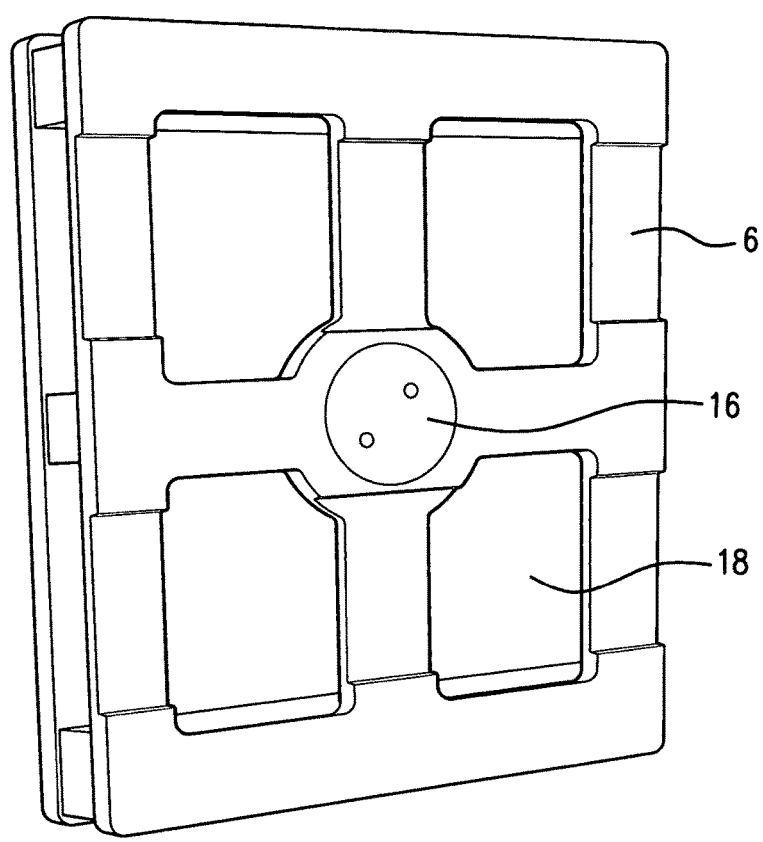
FIG. 2 is a perspective schematic view of the underside of the pallet shown in FIG. 1 illustrating a cover for a second compartment for housing a pallet tracking device.

In accordance with the present invention any style, type or size of pallet comprising wood, plastic, metal, composites and combinations thereof rosy be utilized in management of a supply chain between a manufacturer and a customer. A pallet, structure particularly well suited for the invention is illustrated in FIGS. 1 and 2, and described in greater detail in U.S. patent application Ser. No. 14/556,187 filed Dec. 9, 2014, which is incorporated in its entirety by reference as though fully set forth herein.

The pallet 2 shown in FIG. 1 represents a Grocery Manufacturers Association (GMA) style 48×40 inch rackable plastic pallet. The pallet includes a deck 4 suspended above a base 6 by nine blocks 8. The blocks separate the deck and base allowing entry of pallet handling equipment (not shown) to move to pallet. The deck is substantially flat for supporting loads thereon. The deck includes a compartment 10 having a removable cover 12. The compartment is provided to carry a pallet tracking device 14. As seen in FIG. 2, the underside of the base of the pallet shown in FIG. 1 optionally includes a second cover 16 that closes a second compartment for housing a second pallet tracking device. The base also has four cut-outs 18 for accommodating pallet handling equipment.

Although two pallet tracking devices can be accommodated in pallet 2, the invention may be practiced with one such device, which may be accommodated in the first or second compartment. In one embodiment a removable power supply with a battery (not shown) is housed in the base and the electronic pallet tracking equipment is housed in the deck. A physical and electrical connection is made inside the center block of the pallet between the deck and base to establish an electrical connection. Although compartments can be provided anywhere on the outside surfaces of the deck and base, the center of the pallet is a preferred location.

Figure 3:
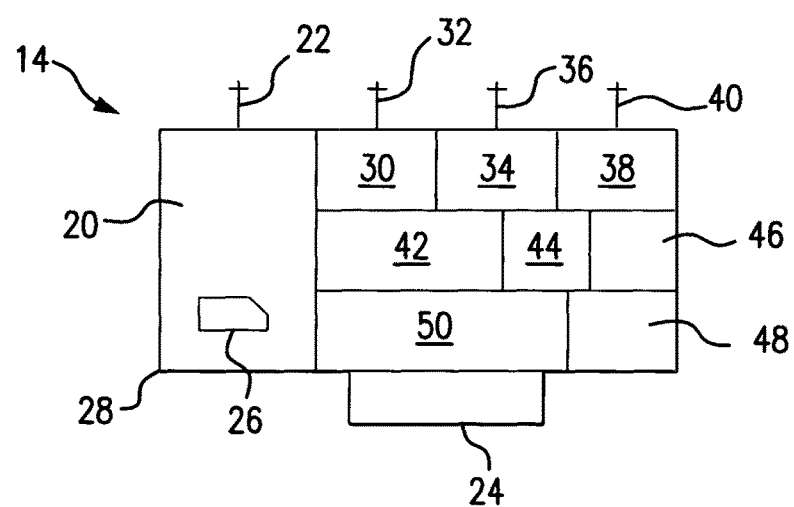
FIG. 3 is a schematic representation of the components of a pallet tracking device for pallets.

One example of the pallet tracking device 14 is shown in FIG. 3. The device is assembled in pieces which are affixed to one or more circuit boards 28 or consolidated into a custom application chip set or application specific integrated circuits (ASICs).

The essential components of the device for and used by the pallet pool operator include a GSM/CDMA block 20 for communicating in a GSM and/or a CDMA national digital cellular network. Although GSM and CDMA networks are listed, other 2G, 3G and 4G cellular networks fall within the scope of the invention. The multi-modal cellular block is implemented in an off the shelf machine to machine (M2M) module sourced from a company such as Sierra Wireless headquartered in Richmond, British Columbia, Canada. The GSM/CDMA block includes a subscriber identification module (SIM) 26 to uniquely identify the module and the pallet with which it is associated in either the GSM cellular network or the CDMA cellular network. The M2M module may also include sensors and microprocessors with space for memory for managing the independent operation of the cellular block as a pallet tracking accessory used chiefly by the pool operator. The GSM/CDMA block is powered by battery 24 and provides 24/7/365 pallet visibility in nationwide GSM and CDMA cellular networks operated by large North African providers including Sprint, AT&T, Verizon, Bell and Rogers using radio frequency antenna 22.

The GSM/CDMA block is used by the owner of the pallet to track the whereabouts and condition of the pallet for the purposes of managing the pallet for rental purposes during its lifetime. A pallet may last ten years and used to complete 90 or more individual pallet rental trips. A large pallet pool operator may have 50 million pallets or more. Keeping track of invisible pallets (i.e. wood pallets that are not serialized and cannot be tracked wirelessly) requires a brick and mortar infrastructure and transportation system to physically recover, store, inspect, repair, re-issue and manage the pallets for distribution across North America. With the present invention, the legacy brick and mortar costs are replaced with a lower cost Internet of Things (IoT) solution involving smart pallets connected to the Internet and roam between supply chain partners with each transfer of custody being recognized by the pallet pooling and management system.

The pallets are connected to the internet using the GSM/CDMA block or embedded wireless M2M module. The pool operator instructs the M2M module over the cellular network to report its geo-location according to a selected reporting period corresponding to a protocol developed for each different pallet rental customer. With each report the pallet can be visually located on a Google map presented on a PC or smart device and managed on a viewable dashboard using background algorithms best suited for the pallet's use. Deviations of the pallet from an intended path are communicated to the pallet customer electronically on an alert basis so that the customer can intervene to prevent a pallet from being lost or a load from being rejected or lost due to an observed or sensed risk. Off the shelf M2M modules include sensors for GPS, temperature, impact and the like. If a pallet is damaged in use, such as by a fork lift impact, a real time sensor reading indicative of pallet damage can be sent at a designated time to the pool operator who can electronically document and then bill the customer for repair costs because of improper handling or misuse.

The pool operator can also document the path taken by each individual pallet during each customer defined rental trip from point A to B. This cannot be accomplished using today's state of the art wood pallets which are invisible between points A and B.

A plastic pool operator can recover the initial difference between the lower cost of a wood pallet and the higher cost of a plastic pallet by selling carbon credit offsets over the life of the plastic pallet. Carbon credits arcs based upon the low weight and fuel efficiency of a plastic pallet weighing 50 lbs, compared to 78 lbs, for an average pooled GMA style wood pallet. A pool of 50 million GMA style plastic pallets weighing 2.5 billion pounds compares to 3.9 for an equivalent wooden pallet pool. If a GMA style wood pallet averages five 820 mile pallet rental trips per year the macro difference between a plastic pallet pool and a wooden pallet pool is the equivalent of transporting 1.4 billion pounds 4100 miles a year. Viewed in this context, a plastic pallet pool is more sustainable than a wooden pallet pool.

The pool operator invoices the pallet customer electronically for the use of the pallet between points A and B. An electronic Pallet Trip File is included with each invoice. The electronic pallet trip file contains structured data distilled from the aggregate data collected by the pool operator during the identified pallet rental trip to produce an invoice. The structured data in the Pallet Trip File can be used by the pallet customer to document a supply chain pedigree for a product transported on the smart pallet between points A and B, for meeting regulatory, insurance and business rules, premiums and goals.

The pool operator generates a tremendous amount of data in the process of managing the pallet pool for distribution over the years. This huge amount of information is captured in a secure Cloud data bass owned and administered by the pool operator. One such Cloud data base is called Fast Track and is owned by GoTo Pallets, of Surrey, British Columbia. This first layer of information collected from the pallet tracking device is collected in the Cloud as content for a Fast Track business application used exclusively by the pool operator.

As discussed in greater detail below, large pallet customers rent millions of pooled pallets and will accumulate huge amounts of data in the form of Pallet Trip Files. The customers access the trip files and stores their shipping details on a secure Cloud platform called the Fast Fix application, owned by GoTo Pallets. The Fast Fix application presents a dashboard representing the systems and sensors on each smart pallet. Customers define the settings selected from menus and may eventually collect a large amount of data that it can use to better manage its business in the age of the IoT and Global Warming.

In addition to the GSM/CDMA block, the pallet tracking device optionally includes a suite of additional communications systems that co-exist within customer supply chains. These other communication systems are deployed by pallet customers and their supply chain partners to facilitate internal and external communications networks that increase productivity. The pool operators provide their pallet tracking devices with additional equipment that is more relevant and useful for the pallet customers who rent the pallets to ship their goods to market. The pool operators rent these additional electronic resources to the pallet customer on a value-added basis.

As seen in FIG. 3, the pallet, tracking device 14 optionally includes an EPC Read/Write block 30 that is integrated with the GSM/CDMA block 20. EPC stands for Electronic Product Code. The EPC R/W block may be implemented in a separates modules that is affixed or soldered to the circuit board or integrated into an application specific chip set. The EPC R/W block is provided for communicating with EPC RFID tags affixed to objects carried on the pallet or distributed in the supply chain environment. The EPC R/W block includes a radio frequency antenna 32 which is capable of sending and receiving radio frequency signals operating in the 860-960 MHz UHF range. The EPC R/W block functions as an interrogator that can for example conduct an on-demand inventory of the objects with tags carried by the pallet. The EPC R/W block includes a memory capable of maintaining a manifest record, including a timer for when the objects were placed and removed from the pallet during a rental trip. For example, if the GSM/CDMA block observes that the pallet has departed from a geo-path of the intended trip, or if a GSM/CDMA block sensor observes a condition indicative of tampering, the EPC R/W block is triggered to conduct an on-demand inventory of the EPC RFID tags associated with the pallet load to provide an up-dated manifest record. If a subsequent manifest record deviates in any way from the original manifest record the integrated GSM/CDMA block transmits a message identifying the time, place and circumstances associated with a possible loss or risk in the supply chain associated with items on the individual pallet. In this manner the pallet customer using the pallet to ship goods to market receives actionable data used to reduce, repair or account for a loss suffered in the supply chain.

As further shown in FIG. 3 the pallet tracking device optionally include an ISO 18000 block 34 and/or an IEEE 802 block 38, ISO 18000 represents an international standard that describes a series of diverse RFID technologies that use different radio frequencies. For example, ISO 18000 includes Part 2 involving parameters for air interface communications below 135 kHz, which are used in industrial environments. ISO 18000 Part 3 involves parameters for air interface communications at 13.56 MHz, and which also may be known as Near Field Communications (NFC). ISO 18000 Part 4 involves parameters for air interfaces communications at 2.45 GHz. ISO 18000 Part 6 involves parameters for air interface communications at 860 to 960 MHz (and which may be known as EPC). The EPC component may be an active interrogator, an active re-writable SSCC tag or a passive GRAI tag with non-rewritable memory. ISO 18000 Part 7 involves parameters for active air interface communications at 433 MHz, and which may also be recognized as one or more of the DASH standards. The ISO 18000 block includes an antenna array 36 which is optionally capable of simultaneously operating on one or more of air interface protocols under the ISO 18000 standard.

By way of example, a supply chain manager positions a smart phone within inches of the pallet compartment to communicate with a Part 3 component of the ISO 18000 block to uniquely identify the individual pallet. Alternatively, a fork, lift operator interrogates the Part 6 component of the ISO 18000 block to retrieve an EPC identification code associated with the pallet that is linked to a logistics database in a warehouse where obtained information is used to call up instructions relating to the automatic movement or placement of the pallet for a loading, storing or shipping purpose. Similarly, a tractor trailer arriving at a distribution center equipped with a long range (1000 meters) DASH network communicates with the Part 7 component of the ISO 18000 block to automate the delivery and handling process of an arriving pallet load. For example, the system alerts a fork lift operator to standby to remove a specific pallet from the tractor trailer as soon as it backs into a loading dock so that identified pallet load with a possible sensitive perishable product can be quickly transported to a cold storage area within the facility to minimize or mitigate against potential risks and losses.

The IEEE 802 Block likewise included a family of IEEE or Ethernet air interface standards dealing with local area networks. The IEEE 802 block optionally includes a number of different standard operating elements that include, but are not limited to, IEEE 802.11 for Wireless LAN or Wi-Fi, IEEE 802.15.n for Bluetooth, Zigbee and mesh networking and IEEE 802.16.n for WiMax and Broadband networks. Some of the IEEE 802 elements, such the Bluetooth or Zigbee devices may also be known as RFID tags because they can be used to uniquely identify the pallet. The IEEE 802 block components can be affixed to the circuit board or provided in application specific integrated circuits of a chip set or in combinations. The IEEE 802 block also includes an antenna array 40 which is optionally capable of simultaneously operating on one or more air interface protocols under the IEEE 802 standard.

Most distribution facilities and warehouse or enterprises have already established one or more local wireless networks to integrate all of the proprietary devices deployed in the environment to connect things to the Internet or a resident operating system used for resource planning, management and budgeting. It is less expensive to rent a pallet with a surrogate ability to speak for the products on the pallet than endowing each product with a separate device capable of speaking for itself. The pallet tracker communicates over such pre-existing IEEE and ISO local area networks to provide local visibility. Use of these networks is also less expensive than routing information through the GSM/CDMA block, which involves the use of airtime and results in a month-end bill from a cellular service provider or mobile virtual network operator (MVNO).

As further shown in FIG. 3, the pallet tracking device includes a central processing unit (CPU)/microcontroller block 42 for coordinating the activities and management of the communication block components 20, 30, 34 and 38. The CPU/microcontroller block is also integrated with a memory block 44 which comprises storage spaces for operating programs, dynamic software instructions and for various read only and re-writable memory applications required to implement the invention in its various forms. Some of the memory is used to manage data obtained from a sensor block 46, a GPS component 48 for obtaining geo-location coordinates, and a power block 50 which is used to control and manage the power resources and battery 24 of the pallet tracking device.

Figure 4:
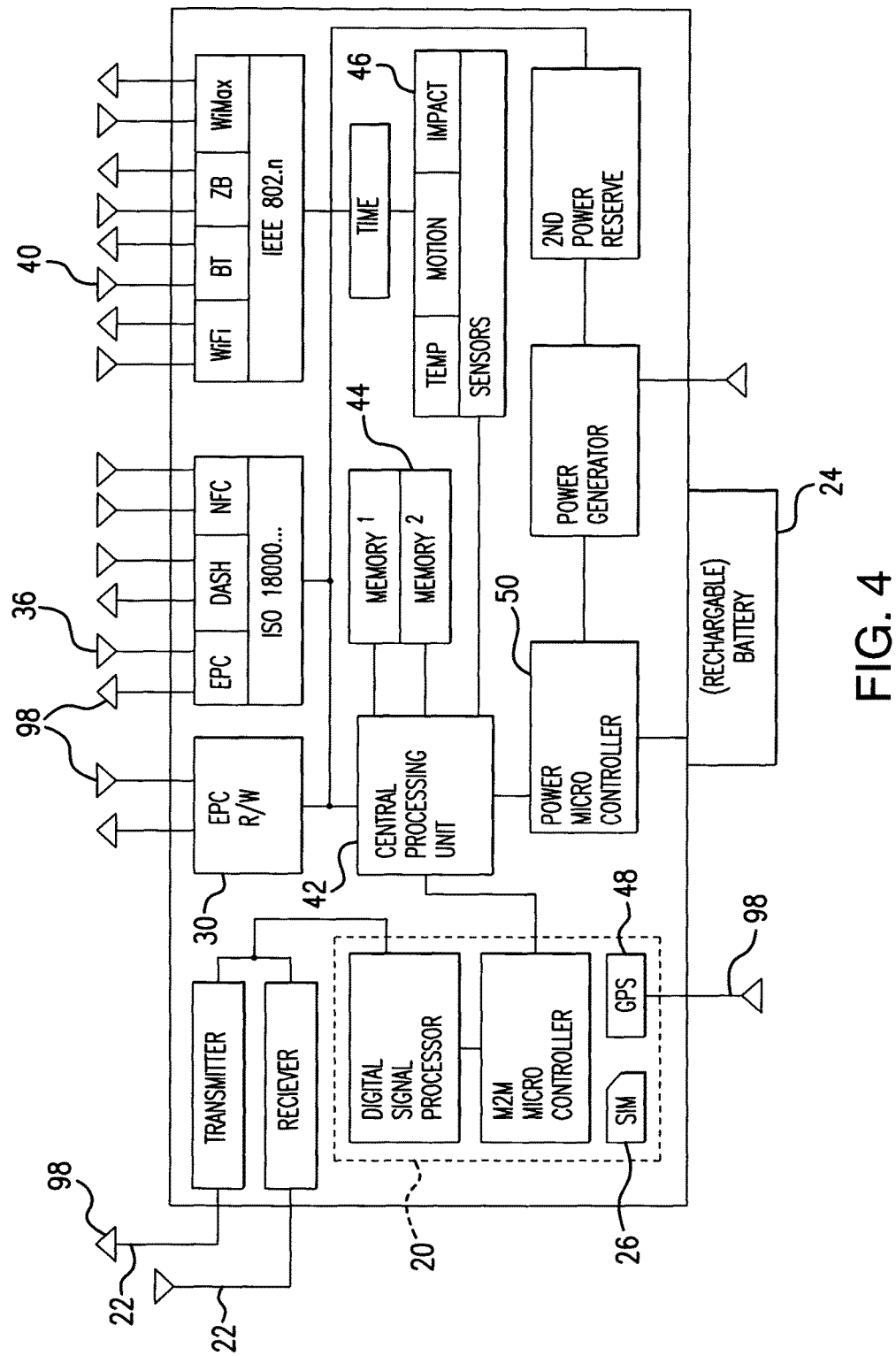
FIG. 4 is a diagrammatic illustration of the pallet tracking device.

How referring to FIG. 4, there is a diagrammatically illustrated multi-modal, multi-frequency pallet, tracking device as described and shown in FIG. 3.

It should be understood that, the additional communication blocks 30, 34 and 38 are provided by the pallet pool operator for the pallet customers who use the pallet for transporting goods to market. These additional resources provide additional granularity into the conditions influencing the products on the pallet between points A and B. For example, the pool operator does not know what products the pallet customer is shipping on the pallet. In one case, the customer may be shipping a perishable product that is subject to loss if the temperature exceeds a certain threshold. Therefore, the pool operator provides a web portal where the customer can configure a temperature sensor with the pallet tracking device on a PC or smart phone dashboard to take a temperature reading at a pre-defined interval for the duration of the intended pallet rental trip. With the click of a button on the dashboard, the pallet tracking device is remotely instructed over the GSM/CDMA cellular network to begin taking temperature readings according to the pre-defined criteria at the beginning of the pallet rental trip set by the shipping manager for the customer. If the temperature level record is not exceeded during the trip the pallet customer can document a successful supply chain pedigree for the product, between points A and B.

Figure 5:
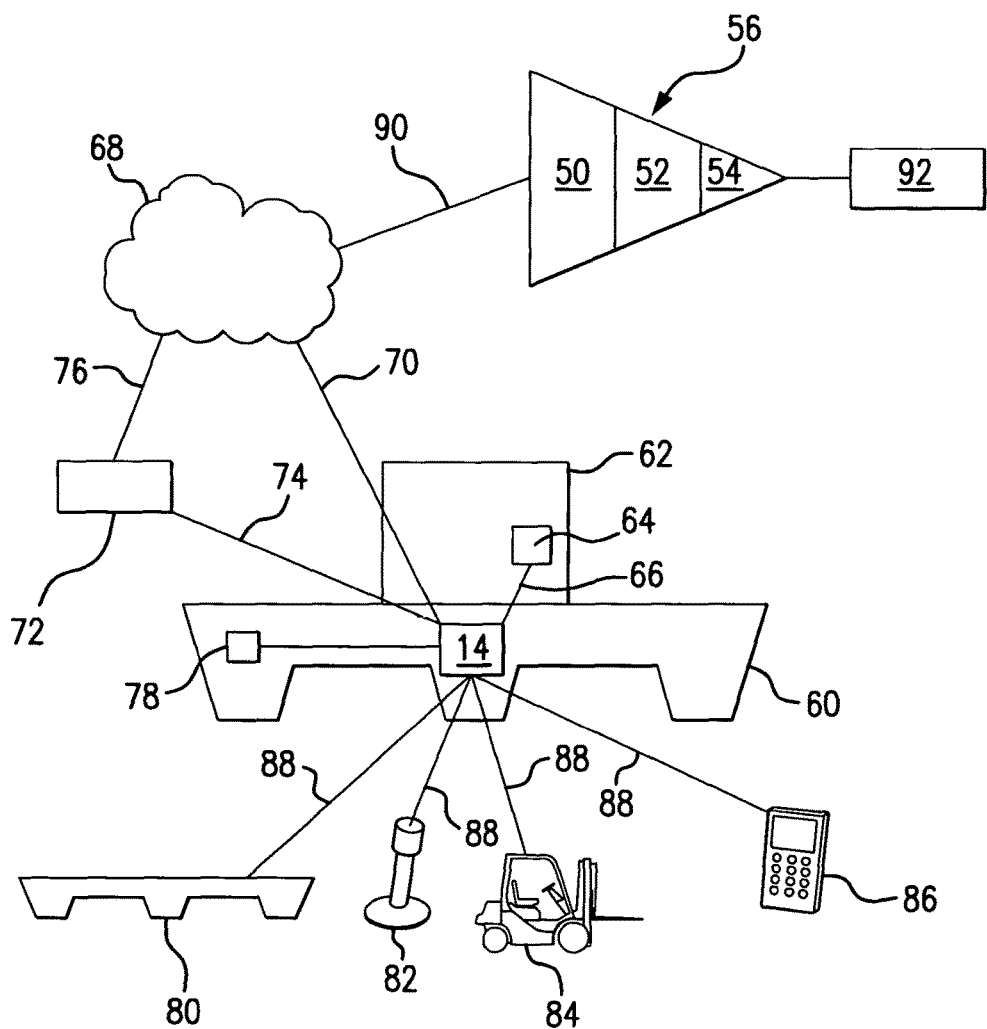
FIG. 5 is a diagrammatic illustration of the various communication channels used in the methods of operation of the pallet tracking device in a smart pallet supply chain.

Referring to FIG. 5 there is illustrated pallet 60 having pallet tracking device 14 shown supporting a product 62 having a machine readable identifier 64. The machine readable identifier is a radio frequency tag or label selected from a group comprising an EPC, NFC, DASH, Zigbee or Bluetooth RFID device. The pallet tracking device is communicatively coupled with said identifier as indicated at line 66 using an available communication channel.

The pallet tracking device is operably connected to the internet 68 by a gateway formed by a cellular communications channel 70 and alternately a local area network gateway 72 through an IEEE 802.n or ISO 18000 communications channel 74. This gateway is ultimately connected to the internet by wireless and or wired means 76 well known in the art.

As further shown in FIG. 5, the pallet tracking device 14 communicates with the identifier at line 66 to obtain rules relating to how the product is to be handled within the supply chain. Alternatively, the pallet customer uses channel 70, by way of example, to send a message having instructions to the pallet for how the product is to be handled within the supply chain. The pallet tracking device and its suite of sensors is configured according to a user-defined criteria using a menu of options and a tally button before sending a command to the smart pallet.

The pallet tracking device 14 is further connected to other machine readable devices within its environment. For example, the pallet tracking device communicatively couples with machine readable identifiers 78 embedded within the pallet or positioned along the pathway traveled by the pallet during a pallet rental trip. Some of these other machine readable identifiers are selected from a group including, but not limited to, other smart pallets 80, portals 82 (including dock doors, conveyors, area beacons and the like), pallet handling equipment 84 and hand held or wearable smart devices 86. The pallet tracking device is connected to the internet through these remote devices using one or more IEEE 802.n or ISO 18000 standard channels 88 of communication.

In accordance with the present invention the pallet tracking device is situationally aware of the circumstances, conditions, location and manifest of product(s) it carries at all times using a variety of devices and communications channels. Further all of the data aggregated, collected, sensed and generated by the apparatus in the system (collectively supply chain data) is accessed through a web portal 90 administered by the pool operator. At the web portal the collective supply chain data is filtered through three organizational layers, where the first layer 50 corresponds to macro pallet level data, the second layer 52 corresponds to the micro product level data, and the third layer 54 corresponds to structured data of interest to a consumer 92 regarding the product pallet trip.

Figure 6:
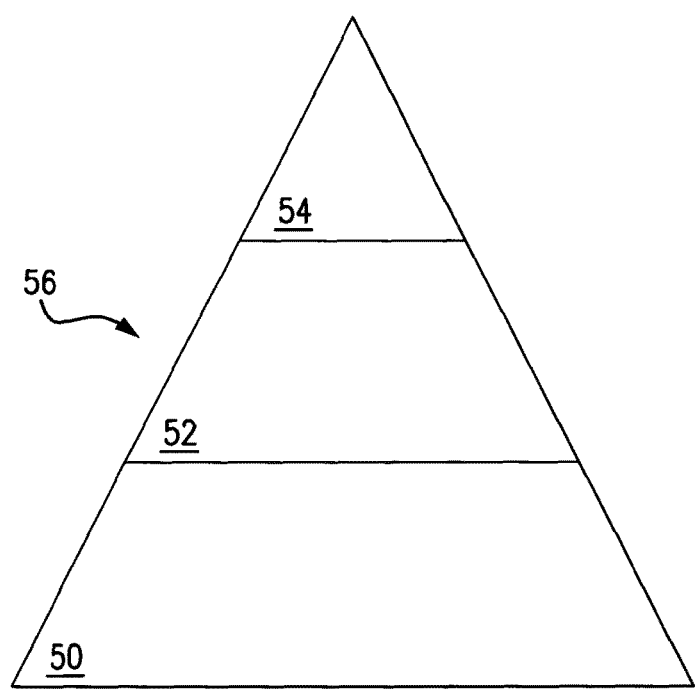
FIG. 6 is an organizational chart illustrating three layers of supply chain data generated by the pallet tracking device in a supply chain.

Additionally in accordance with the present invention the pallet tracking device generates two layers of data during a rental trip. As shown in FIG. 6 the first layer of data 50 is relevant to the management of the pallet by the pool operator. The first layer of data is known as Fast Track™, a trademark owned by GoTo Pallets, Inc. and includes data including but not limited to the names, locations, times, electronic resources used and conditions of every pallet trip collected from every smart pallet during its life. The first layer collects the all of the supply chain data from millions of pallets.

The second layer of data 52 is relevant to the management of the goods transported on the pallet by the pallet customer. The second layer of data is known as Fast Fix™, a trademark owned by GoTo Pallets, Inc. and includes data comprising but not limited to what, where and when the product was picked up and dropped off, plus any sensor readings collected during the rental trip. The many different ways in which a pallet, customer may use the smart pallet of the present invention are described in the following examples.

Example One

A brand name manufacturer of ice cream located in Boston ships product to a national retailer's distribution center in Houston, 2,961 miles away. The manufacturer uses a $3^{rd}$ party refrigerated 53' trailer to deliver 187,200 1.5 liter packages of ice cream with a retail value of $8.17 or $1,529,424 for the load/trip. The manufacturer makes eighteen deliveries to this particular destination each year using the smart pallet. Each trip requires 26 smart pallets. The manufacture ships many more truck loads throughout the year however, the shipping manager has standardized the trip settings and configurations from a menu having the right recipe for the 18 trips in this example. The 2,961 mile trip normally takes 60 hours from start to finish, between points A and B.

In this example, the ISO 18000 RFID Options that cost money are disabled. The ice cream packages do not include RFID tags so there is no reason to use the EPC SSCC or UHF Reader/Writer to capture RFID data about the ice cream. The refer truck transporting the ice cream does not have a DASH communications system, so there in no reason to enable this feature of these systems. The smart pallet otherwise includes a free EPC GRAI and NFC tag to identify the pallet, and it load, by association in a Cloud database.

The IEEE 802 RFID Options are enabled by the shipping manager. The WiFi option is configured to report the departure and arrival of the pallet within the LAN at the manufacturer and the distribution center. Each WiFi report from 26 pallets cost $0.18, or $9.36 for the shipment (of all 26 pallets). The Bluetooth option is configured to allow each pallet to interface for $0.07 with forklifts loading and unloading the pallet and workers with handheld devices up to four times, costing $7.28. The Zigbee option is enabled to permit all 26 pallets to form a mesh network. The Zigbee devices are connected to sensors. The temperature sensors are enabled, to monitor the conditions of the temperature sensitive ice cream every hour for 60 hours. Each sensor reading at each pallet costs $0.05. After each temperature reading all of the Zigbee tags report their readings, costing $0.04 a report. The combined actions cost $78 and $62.40, respectively for the standard pallet rental trip. The user-defined options which have enabled the IEEE 802 RFID Options provide a high degree of actionable intelligence about the pallet load during its journey from the manufacturer to the retailer's distribution facility. This level of granularity permits to manufacturer to provide an e-pedigree for the products it has delivered.

The Cellular Options are finally configured to provide each pallet with 24/7 nationwide visibility. In this case, the lower cost CDMA cellular communications devices in two of the 26 pallets are enabled. One is for a back-up. All of the Zigbee devices form a network that is hosted by the pallet with the enabled Cellular Option(s). The Zigbee device with the activated cellular device acts as a gateway for the other Zigbee tags in the group or mesh network. The Cellular Option is configured to report up to 2.5 times during the 60 hour trip if everything goes okay. The cellular device will aggregate the reports from all of the pallets throughout the day and report this data on a user-defined schedule. At the same time, a Geofense parameter is selected, so that if the transport vehicle, for example, detours 20 miles outside of the direct path to the destination, or a pallet is stolen from the back of the truck, the cell phone reports a deviation from the geofence. The costs to establish the geofence and provide air time for reporting trip data over the CDMA cellular network costs $21.90 for the each pallet load.

In this example, the extra electronic pallet rental fees amount to $178.94, or $6.88 for each of the 26 pallets used in the rental trip. This cost equals $0.00096 per package of ice cream. This additional cost is incurred to insure the product is delivered with an e-pedigree.

If, in the old supply chain utilizing a wood pallet, the refer truck malfunctions and the ice cream thaws before it is delivered to the retailer, then the truck load will not be accepted, resulting in a total loss to the manufacturer of $1.5 million. If the ice cream is accepted, distributed and sold, and a consumer becomes ill, then all of the affected ice cream would be recalled, impacting the operating costs of the retailer along with its reputation. The combined financial costs for the manufacturer, retailer, customer, insurer and government could be considerable and long term.

If, using a smart pallet, a refrigeration unit in a refer truck malfunctions during a summer time delivery and a Zigbee device records a high temperature at the back of the trailer that would risk the safety the ice cream on that pallet, then an SMS message is sent to the shipping manager providing an alert. Based upon real time data emanating from the smart pallets the shipping manager logs into the Fast Fix program to reconfigure the affected pallets to step up their reporting frequency. If an unacceptable risk exists, the refer truck is diverted to a nearest cold storage facility where the affected pallet loads are quarantined and the remaining recovered pallets are diverted to new supply chains, allowing a total loss of the load to be averted with remedial action.

Example Two

A manufacturer of a pharmaceutical product ships five pallet loads to a national distribution center where the goods are cross-docked and re-routed for delivery to five regional distribution centers. The manufacturer uses a $3^{rd}$ party delivery service to transport the product to the national distribution center and the distributor uses its own transportation means to ship the products to its regional distribution center. The delivery is complete when the products have been received at the five regional centers. The empty pallets are returned to the national distribution center by reverse logistics. The average duration of the journey of each pallet is +/−22 days and the average distance traveled is 1,802 miles.

The products are packaged for pharmacy dispensaries in 250 ML pill bottles containing 200 pills. Each bottle includes an NFC RFID tag providing content data. Twelve bottles are packaged in a carton. Each carton includes an EPC RFID tag containing serialization information for its contents of 2400 pills. The 48 cartons, carrying 115,200 pills are loaded onto each pallet. Each pill has a retail value of $6.00. The five pallet loads with 576,000 pills are worth a total of $3.5 million. The shipping manager configures each pallet for the first leg of the journey to the national distribution center and again for the second leg of the journey to the regional distribution centers.

The pallet EPC SSCC tag is enabled so that the manufacturer can aggregate and store the individual EPC RFID tag data, identifying the serial numbers of the 48 cartons loaded on each pallet. The pills themselves may block the individual tags on the cartons in the middle of the pallet load. However, the EPC SSCC tag insures a more accurate reading. The EPC RFID tag is configured to report its manifest data when the pallet load leaves the manufacturer's plant to provide an advanced shipping notification (ASN) to the national distribution center. The EPC SSCC tag is read to document delivery of the pallet loads when it arrives and to send an ASN to the regional distribution centers, where the EPC SSCC tags are read to automate the receipt and handling of each pallet load. The cost to use the pallet EPC SSCC options are $0.85 for each time the EPC SSCC data is modified during each leg of the journey. There are three required memory transactions. Therefore, the total cost for the intended delivery is $12.75 for the EPC SSCC option.

The value of the pharmaceutical products shipped on the five pallets is worth $3.5 million. The risk of theft and counterfeiting is high. The pallet UHF Reader/Writer is enabled for the rental trip. The UHF Reader/Writer is configured to automatically read the individual EPC RFID tags on each carton several times during their journey. The reader is also configured to conduct an on-demand inventory when certain sensed conditions exist or on a schedule. If the truck stops, then the reader is configured to update the manifest when the pallet senses a condition or is on the move again. This allows losses to be identified in real time. Ten readings by the UHF Reader/Writer are anticipated for the pallet rental trip. Each reading costs $0.65. The cost to read the EPC RFID tags on the cartons to preserve an accurate e-manifest is $32.50.

The IEEE 802 WiFi(RTLS) and Bluetooth options are also enabled. The WiFi and Bluetooth options are enabled to permit seamless cross-docking and other automation at and between the national and regional distribution centers. In operation, when the EPC SSCC tag on each pallet is read at the dock door, the LAN at the distribution center accepts an electronic handoff and takes over management of the pallet. The LAN host computer system communicates with a fork lift which instructs the fork lift operator on a display where the pallet is to be stored, staged or shipped. The cost to enable the WiFi and Bluetooth options is $0.18 and $0.07 respectively and the options are expected to be used 4 or 5 times each, costing $6.90 for the rental of five pallets.

In order to provide a means to report the theft or a risk observed by the UHF Reader/Writer or one or more of the sensors on the pallets, the GSM Cellular option is enabled. The cellular option provides 24/7 visibility nationwide and is configured to report a real or potential threat electronically to the manufacturer's computer system or the shipping manager's smartphone or PC. During the summer months, the temperature sensor in each pallet is enabled to document temperature conditions. (The pharmaceutical products are sensitive to higher temperatures.) The pallet is configured to set a Geofence of 35 miles from an intended road map between each leg of the journey. If a bridge is washed out and a diversion outside the geofence occurs, then the receiving party is notified of a possible delay. The GSM cellular option is configured to aggregate data and report for five pallets eight times during the intended trip. The cost to collect, aggregate and report the data from the enabled RFID options and the on-boards sensors using the GSM Cellular option is $74.75.

The total cost for electronic surveillance and e-manifesting is $125.90, which works out to $25.18 per pallet. These extra costs amount to $0.00022 per pill. The insurance provided by this additional cost is realized when the LTL pallet load is compromised by organized crime. Removal of one or more cartons from the pallet could cost tens of thousands of dollars in potential losses, as well as risk to safety of patients who unwittingly consume counterfeit pills replaced on the pallet load. The GSM cellular option can be configured to send a report of a sensed problem in real time, while the activity is occurring, leading to a more likely prompt apprehension of the crooks.

Example Three

A consumer electronics manufacturer with facilities in Los Angeles ships mixed loads of PCs, printers and monitors to Regional Distributors located throughout the country. The manufacturer operates a fleet of tractor trailers having DASH 7 equipment. A DASH network is installed at the manufacturer's warehouse and yard facilities for automated fleet management and (inbound and outbound) logistics security. The trucks in the fleet are also linked to cellular networks for operational and nationwide fleet tacking purposes. The manufacturer has 24/7 fleet visibility.

On one particular run the manufacturer drops off a number of pallets at different locations before arriving at a final destination situated in Oklahoma City, 1381 miles away. The exemplary load utilizes 60 pallets to transport 9,720 individual products, collectively worth $2.9 million. There are five stops in this scenario. At each stop the manufacturer recovers empty pallets for reverse logistics back to Los Angeles. When the pallets are delivered to the their parties, the DASH systems are disabled and the pallet is placed into an electronic standby low power mode. The receiving distribution center has the option to enable RFID, wireless or other sensor options for the duration of their use and custody of the pallet.

The pallet DASH Option is enabled in each pallet so that the pallets can interface within manufacturer's DASH network. At each leg of the journey the DASH system is accessed to ensure the correct pallet is delivered at the right locations. A display in the truck provides a list of what is being delivered or returned at each stop to avoid driver error or miscommunication. The DASH system conducts on-demand inventory reconciliation at each stop to maintain an e-pedigree. The DASH option integrates into truck fleet communications systems, which can substitute for other electronic equipment in the pallet. The DASH option costs $1.15 for each pallet, each time it is used in a trip. The shipping manager pre-configures five DASH events for the present logistics undertaking. The cost is $345 for 60 pallets.

A portion of the higher value goods loaded on the pallets are tagged with RFID EPC tags for item identification and security in retail settings. The EPC SSCC option is enabled, allowing the manufacturer to record the mixed bill of material on each pallet electronically. This information is linked to the DASH network. When the pallet is received at the destination the receiver employs EPC RFID network infrastructures to manage the inventory. All the products placed on the pallet at the manufacturers distribution facility are recorded in the pallet's rewritable RFID SSCC tags. Using the pallet's on-board SSCC tag is less expensive and more robust than a passive slap and ship RFID shipping label costing $1.15, which is discarded at the end. A DASH to EPC hand-off occurs in the process. The cost of the EPC RFID Option is $102.

The UHF Reader/Writer Option is enabled so that an on-demand inventory of EPC tags can be conducted if indications of potential risk are sensed. The UHF Reader/Writer Option is turned on by the shipping manager to read the EPC RFID tags on the products two times in their journey from CA to OK. This option costs $78.

The impact/movement sensor is also enabled to record the conditions of travel and handling experienced by the pallet. Sensors can detect whether the product packaging is damaged or stolen. The cost to enable the sensors is $28.8.

In this example, the consumer electronics manufactures uses the pallets on average 18 days. The cost to electronically track, monitor, manifest and report the circumstances for 60 pallet loads delivering $2.9 million dollars of at risk product is $553.80 or $9.23 per pallet. This works out to +/−$0.06 per package.

The electronics in the pallet utilize power constantly. The smart pallet has a ten year range lifecycle. A minimum of 30,000 mAh battery supply are required for this period. Preferably, the power supply is augmented with a power generator for recharging a battery or powering a communications signal. The power supply system is expected to survive 250 trips based upon a demand on power necessary to implement the Fast Track application used by the pool operator. Approximately two thirds or 20,000 mAh of power supply remains and is available for a shipper's user-defined requirement in the Fast Fix App. This works out to 80 mAh per average trip.

A battery consumption Tally Button is provided at the bottom of the configuration page of the Dashboard of the Fast Fix App. If the power budget is exceeded, then a surcharge is applied. This allows the shipping manager to reconfigure the Options Settings to reduce power consumption for the intended trip. The method is beneficial for another reason. If the power resources of a particular pallet are low and the projected power usage exceeds the available power required for the rental trip, then the first low power pallet, is set aside and another pallet which has the necessary power is used in place of the first pallet.

The electronics in the pallet use the Fast Track App to document the distances traveled by each pallet during their lifetime. A plastic pallet weighing 50 pounds is less carbon intensive than a replaced wood pallet weighing 76 pounds. The transportation efficiency of plastic pallets can be calculated when they replace wood pallet to move goods from one location to another. In aggregate, millions of tons of less Co2 emissions would be omitted if today's pool of wood pallets were replaced with lighter weight plastic pallets. The transportation efficiency of plastic pallets can be monetized by those companies that use the smart pallets while trading their credit offsets.

The pallet customer uses the data from Fast Track contained in a Pallet Trip File plus the data from the Fast Fix application containing a Product Trip File to provide content for a Track Back application that the customer uses to get closer to the consumers who have an interest in the products offered that were transported on a smart pallet.

Figure 7:
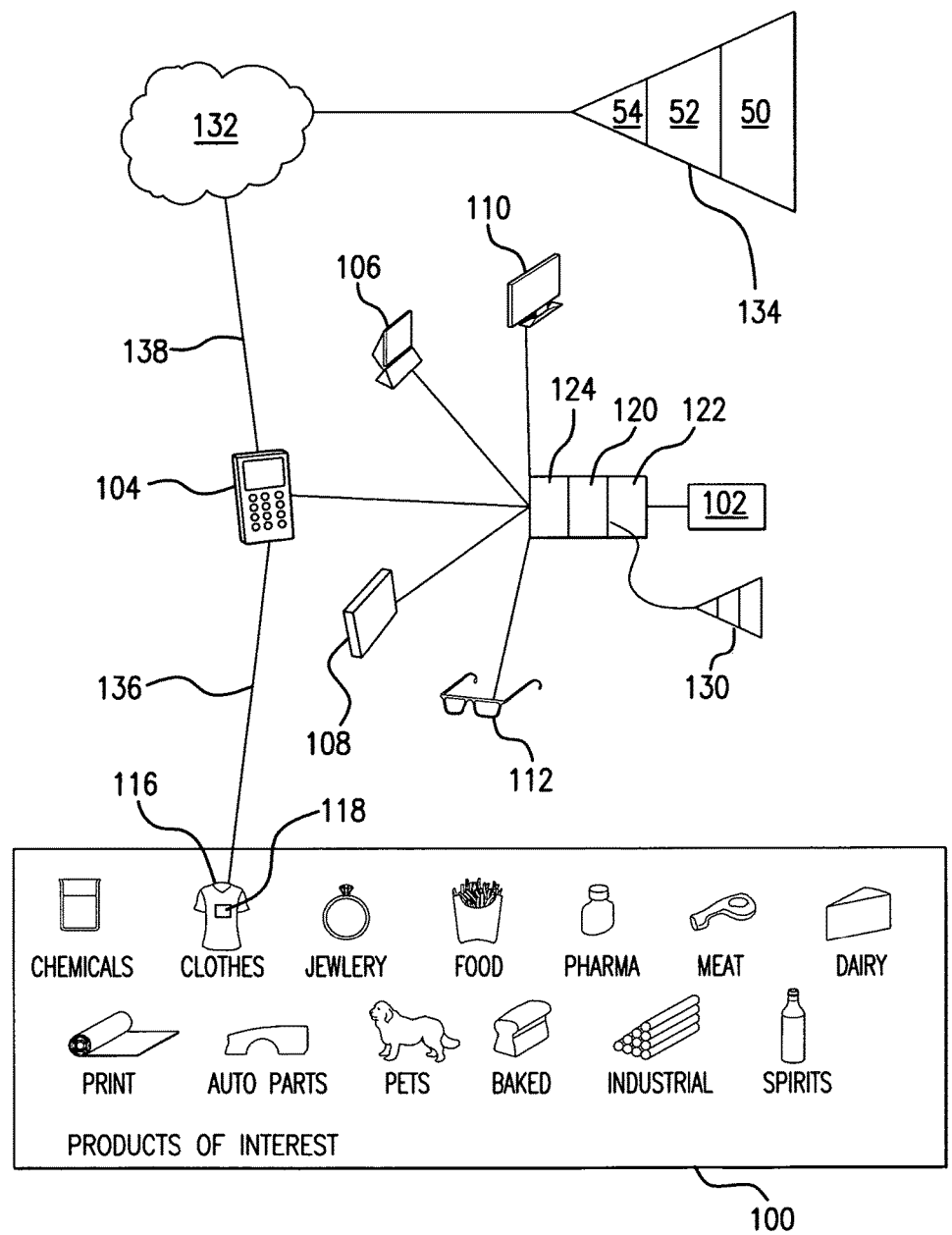
FIG. 7 is a diagrammatic illustration of how a consumer receives supply chain information about a product of interest shipped to market on a smart pallet of the present invention.

Referring to FIG. 7, there is illustrated how the consumer obtains information about a selected product of interest 100. Example products of interest include but are not limited to chemical products, clothes, jewelry, food, pharmaceutical products, meat, dairy, news print, books, auto parts, pets and pet food, baked goods, industrial products, spirits, leather goods, electronics, or any other product capable of being transported to market on a pallet.

The consumer 102 uses hardware such as a smart device 104, which may be a smart phone, a personal computer (PC)

or laptop 106, tablet 108, Smart TV 110, wearable 112, or the like, having a connection to the Internet through the hardware. Consumers are connected to the Internet all day using these various devices.

An operating system (OS) 120 is used to manage the operation of the hardware and its software 122. Operating systems routinely utilized by consumers in their devices include but are not limited to Android, iOS (for Apple), Linux, and Microsoft operating systems.

The consumer down loads a sponsored application to run on the operating system, for example a song. Some consumers download hundreds of apps to run on their personal collection of smart devices. A consumer would visit a website, for example the website www.trackback.com and download an Application 124 to acquire an account membership. This application provided by the pallet owner runs in the background in the OS and only becomes active when an electronic signal from a product identifier is associated with the pallet. This ends the billing cycle in a pallet pooling operation.

The sponsor of the app is the pallet customer who used the smart pallet to ship a product and collect information of interest to a consumer. Over time, many different sponsors will utilize millions of pallet trips to create popular Apps that consumers trust and enable.

When a consumer smart device reads an RFID tag on a product of interest, the OS App defaults to a relevant new application related to the consumer's interest in the product. The pallet customer's app for the product in the IoT is as seamless as the customer prefers and elects in setting in the OS and its applications.

FIG. 7 illustrates an item of clothing 116 and a product identifier 118. Although one product is shown, hundreds of products can be placed on a pallet, and each product provided will have an individual RFID tag. The smart device establishes a communication link with the product identifier and receives a data signal from the product identifier. The product identifier signal launches access to structured information collected by the pallet customer and is made available to the consumer to influence the consumer's buying decision. In this operation, legacy advertising dollars are repurposed into connecting things to the internet.)

The App in the smart device contains limited access to the pallet and supply chain data that makes up the structured data available to the pallet owner and the pallet customer. The memory of the smart device is limited to holding a small amount or not up to date structured data 130.

If the information of interest to the customer using the data resources available in smart device is not enough, then the app redirects and connects the smart device to an internet portal or web-site address 132, where a large amount of structured data 134 is available. The smart device uses a first radio frequency 136 to communicate with the product identifier and a second radio frequency 138 to establish a cellular internet link to the structured data 134 of the more compete Cloud data base administered by the pallet owner and used by the pallet customer to provide information of interest regarding a product shipped on a pallet to the consumer.

In another operation as shown in FIG. 6, the pallet customer uses the data from the first layer, in the form of a Pallet Trip File, along with the proprietary data collected through Fast Fix e-commerce business application. The pallet customer generates a Product Trip File in the second layer, which relates to a product shipped on the pallet. The pallet customer uses the pallet and product trip files to provide content for third layer of data 54 provided to a consumer through a social media application available to the customer using a smart device. The pallet customer publishes an App that allows the consumer to retrieve structured data from the pallet customer selling the product. The third layer of data is known as Track Back™, owned by GoTo Pallets Inc. The consumer visits the Track Back web site and downloads the Track Back Application. Smart devices launch sponsored Apps for many different pallet customers, such as Proctor and Gamble, Unilever, Johnson and Johnson, and the like. Thus, the organizational structure of the data relevant to the consumer is pyramidal in form, as shown in FIG. 6.

The organizational pyramid of data 56 illustrated in FIG. 6 is relevant to a consumer in the following operation. Macro data concerning the pallet during its life relating to the first layer is combined with micro data concerning the product's trip on a pallet through a supply chain. The combined data is presented in a structured format of social media data of interest to a consumer. In operation, a consumer visits the www.trackback.com website and downloads the Track Back application onto a smart phone or PC. A pallet customer or a retail partner develops a proprietary application relevant to the product(s) manufactured, grown or supplied to market on a smart pallet. The proprietary application is uploaded to the Track Back application. The consumer with the Track Back application points his or her smart phone, or is alerted after launching the program, at a product having a QR code or machine readable identification code (such as an NFC or EPC tag or label). In response, the Track Back application launches the proprietary application relevant to the product(s).

In this manner consumers use the Track Back application to trace the origin, history, safety, authenticity, freshness and other important data and conditions indicative of the product's journey from the manufacturer to the consumer, while it was positioned on the smart pallet. This process is documented using the embedded pallet tracking device and provides documentation for a supply chain e-pedigree. This data is used in one method to provide an electronic supply chain pedigree that can direct consumers toward companies that track their products from end to end. Products that are connected to the IoT where they are presented in a social media context relevant to the consumer will prosper in the market resulting in increased sustainability. Consumers will use their smart phones and other devices to make informed purchasing decisions.

In a further example of the use of the present invention consider wild Sockeye salmon from the West Coast of North America which is harvested once a year in the fall. Sockeye salmon is a delicacy that must be conserved in order to preserve it as a wild species and food resource. Wild Sockeye salmon is harvested and packaged for distribution on pallets to supermarkets throughout Canada and the United States and around the world. Farmed salmon is also harvested from ocean pens. Different varieties of salmon are farmed including Sockeye salmon. The efficacy of farmed salmon versus wild Sockeye salmon which survive in natural ecosystems that are burdened with population growth and development are a concern to some consumers who value wild Sockeye salmon.

The wild Sockeye salmon industry uses approximately 28,000 pallet trips per year to deliver its products to market in cold chain conditions. Fresh and previously frozen Sockeye salmon is presented on retail displays along with farmed salmon, which may be packaged as Sockeye salmon at a lower price. Informed consumers of Sockeye salmon recognize the dark coloration of the wild Sockeye as an indication of authenticity. However, farmed salmon are fed food high in carotenes or died in processing to resemble Sockeye and so a discriminating consumer can be confused.

Given the circumstances and motivated to preserve wild Sockeye salmon, the industry partners package the product with machine readable labels, such as QR symbols or RFID tags, that authenticate the product as wild Sockeye salmon and provide a pedigrees history and source transparency based upon the products documented authenticity and supply chain record. The industry develops an App that runs in Track Back. The App provides information of interest to the consumer, including a map showing the location and time of harvesting. For example, the Sockeye salmon is harvested beginning in the fall on the Skeena River from Central British Columbia. The harvest is conducted by purse seine, with no by-catch of other fish species. The Sockeye salmon is harvested in a sustainable fashion and has a Sea Choice™ certification label. External links are provided in the App to provide transparency for the consumer to identify the source of the harvested product.

The fisherman that harvest the Sockeye salmon deliver their catch to fish packing companies for processing where the fish is dressed, filleted or cut into steaks. Sockeye salmon is highly perishable, and the processing plant must obtain ISO 8402 certification to document the quality and safety of it operations and products. Fish processing also concerns proper waste management and the sale of fish meal by-products which the processor documents. The waste products are not disposed in a manner which impacts the environment or aquatic ecosystem.

Once processed, the Sockeye salmons palletized for distribution to the grocery industry or to intermediaries. The major concern is to preserve and prevent the fish products from deteriorating in the cold chain during the product's journey to the consumer. In order to document these cold chain conditions, smart pallets with temperature sensors are used. Some of the pallet loads are transported by air in conditions where the proscribed temperature is dropped to about 0° C. for the fresh seafood market. The remaining palletized frozen products are shipped by road in refrigerated containers or trailers where the temperature is dropped below −18° C. for longer trips. In each case the supply chain manager logs into a secure Fast Fix account and using a dashboard of options and settings commissions the smart pallets and their sensors on a user-defined basis for each air and land transportation journey. The smart pallet collects temperature reading during its intended trip to validate shipping conditions.

If a refer truck malfunctions or is diverted from a path due to unforeseen circumstances, then the at risk Sockeye can be diverted to a cold chain storage facility for quarantine, disposal or recovered for redistribution to nearby outlets to mitigate against a potential total loss with the original trip plan. If, for example, temperature variation within refer truck impacts the freshness of the products on the different pallets, then the supply chain manager redirects the least fresh products to distribution channels that consume the perishable product faster. These practices increase the sustainability of the supply chain and lower indirect costs for the manufacturer, intermediaries, retailers, regulators and consumers. A record of conditions, events, locations and accountability will be aggregated to provide a Trip File. Providing pallet and product trip file data to regulators, insurers, partners and consumers increases transparency so that risks and problems can be identified and eliminated where possible.

A consumer's final selection of Sockeye salmon is in many ways a lifestyle issue. Mobile apps that address lifestyle concerns allow manufacturers to influence the consumer. Wearables devices will connect people to the Internet. The mobile app will authenticate the Sockeye salmon and identify the proper refrigeration temperatures to preserve the fish, cooking suggestions, other omni-channels for future delivery options (Amazon), advanced ordering to next year's Sockeye run, and environmental organizations to contribute donations toward, to name a few extra categories of structured information the FMCG industry can use to impact sales revenue and sustainability.

Threes layers of pallet data are illustrated in FIG. 5. A filtering process occurs as data from the pallet tracking device moves through each layer. In one example, the first layer aggregates all of the tracking data used to calculate a carbon credit from all of the data concerning the individual pallet during a rental trip. This filtered data is accessible to the pallet, customer who trades carbon credits. The filtered data identifies the inputs used to document the credits. The costs saving and reputation for sustainability is presented to the consumer in the App developed by the pallet customer. In the IoT products will in part be priced on their carbon footprint. In the third layer, the filtered and processed information is presented to the consumer who may select the relevant product because it receives a special tax treatment for a low carbon foot print or recognized sustainability index.

In the Internet of Things (IoT), everything is wirelessly connected. However, at this stage in the evolution it is obviously impractical to put a monitoring device on every ice cream package, piece of fish or consumer product in order to pledge a risk free pedigree and to provide source transparency. The next best thing is to supply a re-usable pallet with M2M devices that monitor the temperature and other conditions and environments for all the products they carry during a lifetime. The pallet tracking device of the present invention comprises up to ten communications channels to provide supply chain visibility. Today's lonely wood pallet needs to be replaced with a smart plastic pallet.

Specific embodiments of the present invention have been described above in detail. However, one of ordinary skill in the art appreciates that various modifications and changes can be made without departing from the broadest scope of the present invention. Accordingly, the specification and figures herein are to be regarded in an illustrative rather than a restrictive sense. All herein modifications are intended to be included within the scope of present teachings.

It should also be understood that some embodiments of the present invention may include one or more generic or specialized processors (or "processing devices") such as microprocessors, digital signal processors, customized processors and field programmable gate arrays (FPGAs) and unique stored program instructions (including both software and firmware) that control the one or more processors in the pallet tracking device to implement, in conjunction with certain non-processor circuits, some, most, or all of the functions of the method and/or apparatus described herein. Alternatively, some or all functions can be implemented by a state machine that has no stored program instructions or in one or more application specific integrated circuits (ASICs). Each function or combinations of certain of the functions are implemented as custom logic. A combination of the two approaches can also be used.

Moreover, an embodiment of the present invention can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill given available time, current technology, and economic considerations and when guided by the concepts and principles disclosed herein will be readily capable of generating such software instructions and programs and ICs with minimal experimentation.

According to the provisions of the patent statute, I have explained the principal, preferred construction and mode of operation of my invention and have illustrated and described what I now consider to represent its best embodiments. However, it should understood that, within the scope of the appended claims, the invention may be practiced otherwise than as specifically illustrated and described.

The invention claimed is:

1. A method for presenting pallet trip data associated with delivering a manufactured product to a retail consumer through a social media application created by a manufacturer and downloaded by the consumer onto a personal smart phone comprising the steps:
   the product manufacturer affixing a machine readable identifier onto the product,
   the manufacturer hiring a pallet owner to supply a smart pallet to ship the product through a designated supply chain for delivery to the consumer,
   the pallet owner supplying the smart pallet with a unique identifier and monitoring and reporting capabilities and a connection to a nation-wide wireless network,
   the pallet owner using a first e-commerce business application layer to pre-configure the smart pallet for the manufacturer's proposed trip in the designated supply chain using the wireless network and thereafter transferring custody of the trip enabled smart pallet together with an access code to a dashboard available through an internet portal to the manufacturer,
   the manufacturer using the access code to remotely access a second e-commerce business application layer to configure the programmable condition monitoring and reporting capabilities of the smart pallet for the purpose of documenting a pallet trip record and associating product trip data on the dashboard at a remote work station with an internet connection to generate an electronic supply chain pedigree,
   physically loading the product on the smart pallet and thereafter electronically associating the unique identifier of the smart pallet with the machine readable identifier of the product on the smart pallet through the designated supply chain,
   the smart pallet monitoring conditions and reporting conditions in response to instructions pre-programmed in the first and second e-commerce business application layers during the pallet's trip, and subsequently accessing the condition reports of the second e-commerce business application layer by the manufacturer using the access code to view updates on the dashboard,
   electronically disassociating the product from the smart pallet when the smart pallet reaches its intended destination and custody of the smart pallet is transferred from the manufacturer to the pallet owner,
   the pallet owner providing the manufacturer with an invoice for using the smart pallet along with a pallet rental trip file containing information documented through the first e-commerce business application layer used by the smart pallet owner to manage the smart pallet for rental purposes and information documented through condition reports of the second e-commerce business application layer used by the manufacturer to provide an electronic supply chain pedigree of the product,
   the manufacturer using a third e-commerce business application layer to extract information from aggregated data records of the first and second layers,
   presenting the extracted information in the social media application sponsored by the manufacturer to influence purchasing decisions of the consumer, and
   the consumer bringing the smart phone into communication range of the machine readable identifier on the product to launch a proprietary social media application for displaying the product's supply chain pedigree and other useful information of interest about the product to the consumer.

2. The method as set forth in claim 1 which includes,
   selecting from the first business application layer supply chain data used by the pallet owner at least one data from a list including serial number and manufacture date of the pallet, pallet gross and tear weight, remaining battery power in the smart phone, time, date and location when the smart pallet was delivered to the manufacturer, time, date and location of the smart pallet when the manufacturer relinquishes control of the smart pallet, miles traveled by the smart pallet during the rental trip, time and location when the smart pallet sustains a severe impact, number of times the smart phone was used and how much battery power was consumed by the manufacturer.

3. The method as set forth in claim 1 which includes,
   selecting from the second business application layer supply chain data used by the manufacturer at least one data from a list including the unique identifier associated with the pallet, a manifest of product shipped on the smart pallet including a listing of corresponding product machine readable identifiers, destination and name of a buyer of the product, name and refrigeration responsibilities of a shipping company used to transport the smart pallet, environmental conditions such as upper and lower temperature thresholds recorded by the smart pallet during user-defined temperature readings during the pallet trip, departure of the smart pallet from a designated shipment route or geo-fence boundary indicative of theft, tampering or time sensitive delays, length of time and conditions after the product was delivered to the consumer and when the smart pallet became available for relinquishment to the pallet owner.

4. The method as set forth in claim 1 which includes,
   selecting from the third business application layer information presented in a structured format at least one data from a list including authenticity, safety, ingredients, good to date, carbon foot print, country of origin, safety recalls, sustainability, disposal, distance traveled, date of manufacture, repair, reports, certificates and uses for the product.

5. The method as set forth in claim 1 which includes,
   combining portions of the first business application layer of data including tear weight and miles traveled by the smart pallet and portions of the second business application layer of data including gross and tear weight of the smart pallet and its shipping conditions with the third business application layer of data to provide a carbon foot print and sustainability index for shipment of the product to the consumer.

6. A method for supplying a retail consumer with information about a product of interest shipped on a pallet through a social media application comprising the steps of:
positioning a smart tracking device on a rented pallet to uniquely identify the pallet and to observe and record conditions indicative of a status of the pallet as it is shipped through a supply chain to the consumer,
linking the smart tracking device on the pallet to a wireless network and configuring the smart tracking device to capture a first layer of data for a pallet management data base concerning the status of the pallet during shipment in the supply chain,
affixing a machine readable identifier to the product,
associating the smart tracking device with the machine readable identifier in the pallet management data base,
programming the smart tracking device by a pallet customer to selectively capture a second layer of data in a product data base concerning conditions of the product during shipment in the supply chain,
communicating the first and second layers of data by the smart tracking device to a host server administered by a pallet owner during a pallet rental trip,
aggregating the first layer of data on the status of the movement of the pallet and the second layer of data on the status of the movement of the product in the supply chain to record a complete supply chain history of the product on the pallet at the host server,
filtering from the complete supply chain history on the host server a third layer of data extracted for presentation in a structured format on a social media application sponsored by the product manufacturer,
disassociating the smart tracking device from the machine readable identifier by removing the product from the pallet,
displaying the machine readable identifier on the product to the consumer, and
establishing a communications link between a smart phone and the machine readable identifier to launch the social media application to influence the purchasing behavior of the retail consumer of the product.

7. The method as set forth in claim 6 which includes,
communicating the first and second layers of data at timed intervals selected by the pallet owner and the pallet customer.

8. The method as set forth in claim 6 in which,
programming is user-defined by the pallet customer and based upon the nature of the product and intended supply chain channel.

9. The method as set forth in claim 6 which includes,
storing of the complete supply chain history in the smart tracking device for each pallet rental trip is terminated with disassociation.

10. The method as set forth in claim 6 which includes,
aggregating all of the first layer, second layer, and third layer data from the smart tracking device and all of the identifiers associated with each product during a pallet rental trip.

11. The method as set forth in claim 6 which includes,
filtering the complete supply chain history to discern useful information concerning the product from non-useful information collected during the aggregation step.

12. The method as set forth in claim 6 which includes,
disassociating the smart tracking device from the machine readable identifier when the communications link between the smart tracking device and the last of the product identifiers associated with the smart tracking device is terminated, thereby placing the pallet in condition for another rental trip.

13. The method as set forth in claim 6 wherein,
the social media application has been previously downloaded in the smart phone.

14. The method as set forth in claim 6 which includes,
providing the structured format with supply chain data selected from at least one data from a list including product authenticity, safety regulations, ingredients, nutritional facts, good to date, carbon foot print, country of origin, safety recalls, sustainability, disposal, distance traveled, date of manufacture, repair instructions, reports, certificates, links to other resources and primary uses for the product.

* * * * *